(12) United States Patent
Zhang et al.

(10) Patent No.: US 9,049,674 B2
(45) Date of Patent: Jun. 2, 2015

(54) WIRELESS COMMUNICATION SYSTEM AND DOWNLINK RECEIVING POWER DETECTION METHOD THEREFOR

(75) Inventors: Zhi Zhang, Beijing (CN); Ming Xu, Beijing (CN); Masayuki Hoshino, Kanagawa (JP); Daichi Imamura, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 763 days.

(21) Appl. No.: 13/266,292

(22) PCT Filed: Apr. 9, 2010

(86) PCT No.: PCT/CN2010/071658
§ 371 (c)(1),
(2), (4) Date: Nov. 22, 2011

(87) PCT Pub. No.: WO2010/124552
PCT Pub. Date: Nov. 4, 2010

(65) Prior Publication Data
US 2012/0113842 A1    May 10, 2012

(30) Foreign Application Priority Data

Apr. 27, 2009 (CN) .......................... 2009 1 0136074

(51) Int. Cl.
*H04B 7/005* (2006.01)
*H04W 52/34* (2009.01)

(52) U.S. Cl.
CPC .................................. *H04W 52/343* (2013.01)

(58) Field of Classification Search
CPC ........................... H04B 7/0421; H04L 5/0073
USPC ................................... 370/252, 332; 455/450
See application file for complete search history.

(56) References Cited

U.S. PATENT DOCUMENTS

| 2005/0276359 | A1 | 12/2005 | Xiong |
| 2008/0107194 | A1 | 5/2008 | Cho et al. |
| 2010/0238824 | A1* | 9/2010 | Farajidana et al. ........... 370/252 |
| 2011/0237270 | A1* | 9/2011 | Noh et al. ..................... 455/450 |

FOREIGN PATENT DOCUMENTS

| CN | 101002383 A | 7/2007 |
| CN | 101316125 A | 12/2008 |

OTHER PUBLICATIONS

International Search Report for PCT/CN2010/071658 dated Jun. 17, 2010.

* cited by examiner

*Primary Examiner* — Wanda Z Russell
(74) *Attorney, Agent, or Firm* — Pearne & Gordon LLP

(57) ABSTRACT

A wireless communication system and a method for detecting downlink receiving power in the system are disclosed. N cells in the system respectively transmit data to at least one receiving terminal via N resource blocks using the same time-frequency resources; multiple channel state information reference signals (CSI-RSs) of a corresponding cell are set in each resource block, and orthogonality is maintained among the CSI-RSs of all the cells, wherein N is an integer greater than 1. Said method includes: an additional demodulation reference signal (DM-RS) used for indicating a receiving power is set in a puncture position in the resource block of the first cell which corresponds to a CSI-RS set in a resource block of another cell; and the receiving power of said first cell is detected according to said additional DM-RS. By using said method, the receiving power of a single cell in N cells can be detected, and the system overhead is not increased.

8 Claims, 11 Drawing Sheets

WIRELESS COMMUNICATION SYSTEM AND DOWNLINK RECEIVING POWER DETECTION METHOD THEREFOR

TECHNICAL FIELD

The present invention relates to a communication field. More particularly, the present invention relates to a radio communication system and a method of detecting downlink received power in that system.

BACKGROUND ART

For a current radio communication system of a multi-antenna based on OFDM (Orthogonal Frequency Division Multiplexing), e.g., for LTE-A (Long Term Evolution-Advanced) that is being designed, DL joint transmission is an important technique among downlink multi-base station coordination technique. DL joint transmission is to coordinately transmit the same data stream from a plurality of base stations to a terminal, and each base station is directed to terminals through a specific beam. To achieve optimal system performance, in DL joint transmission, there exists a problem how power should optimally be allocated to the base stations. As an optimal power allocating method of this kind, it is generally required that a terminal can measure received power from each base station, and the measured received power can be fed back to a serving base station as grounds of optimal power allocation. FIG. 1 shows a framework of a typical system of DL joint transmission. As shown in FIG. 1, the same data is transmitted from base stations BS 1 and BS 2, and the data reaches a terminal through beam forming. The terminal feeds back the received power to the serving base station (BS 1) and then, the serving base station determines suitable power allocating methods P1 and P2 (assume that total transmitting power is constant: P1+P2=P).

In a multi-antenna system based on OFDM, two kinds of reference signals exist. One of them is a channel state information reference signal (CSI-RS) and the other one is a demodulation reference signal (DM-RS).

The CSI-RS is cell-specific and is used to represent a channel state of a cell in which a user apparatus is not subject to precoding processing. When data is transmitted to a terminal using a resource block in which base stations of cells have the same time frequency resources, at least two CSI-RSs of the corresponding cell are installed in each resource block. To adopt DL multi-base station coordination, for a particular cell, data transmission is punctured in a position corresponding to a CSI-RS of a cell that is adjacent to the particular cell, i.e., no data is transmitted on a resource corresponding to the CSI-RS of the adjacent cell. As a result imposed by such a puncturing technique (because no data is transmitted in the puncturing position), redundant overhead is increased in the system but since the CSI-RS of adjacent cell strictly keeps orthogonality, the accuracy of channel estimation is enhanced for multi-base station coordination.

Unlike the CSI-RS, the DM-RS is UE-specific, and its acting is used for demodulation of the terminal. Since the DM-RS is for a concrete terminal, it is possible for the terminal to detect the received power based on the DM-RS. In DL joint transmission, however, since the terminal uses coherent detection, a signal detected by the terminal is a superimposed signal from a plurality of base stations, the DM-RSs from different transmission base stations include completely the same mode and thus, the DM-RSs of the different transmission base stations are also superimposed on each other. The superimposed DM-RSs are appropriate concerning the coherent detection. The terminal can measure only total received power from a plurality of base stations by the superimposed DM-RS, but the terminal cannot measure received power from a single base station.

SUMMARY OF INVENTION

In an aspect of the invention, there is provided a method for detecting a downlink received power in a radio communication system, in which N cells (N is an integer greater than 1) transmit data to at least one receiving terminal by N resource blocks having the same time frequency resource, a plurality of channel state information reference signals of corresponding cells are installed in respective resource blocks, orthogonality is kept between the channel state information reference signals of the cells. The method includes: installing an additional demodulation reference signal that is use to represent received power in a puncturing position corresponding to one channel state information reference signal installed in the resource block of another cell in a resource block of a first cell; and detecting received power of the first cell based on the additional demodulation reference signal.

In another aspect of the invention, there is provided a radio communication system. The system includes N (N is an integer greater than 1) adjacent cells, a base station of each of the N adjacent cells transmits data to at least one receiving terminal using N resource blocks having the same time frequency resource, a plurality of channel state information reference signals of corresponding cells are installed in respective resource blocks, orthogonality is kept between channel state information reference signals of each of the cells. In this aspect of the invention, the base station includes a demodulation reference signal allocating section that installs an additional demodulation reference signal in a puncturing position corresponding to one channel state information reference signal installed in a resource block used by another base station in a resource block used by the base station, the additional demodulation reference signal being used to represent received power, and a transmitting section that transmits data to a receiving terminal using a resource block from the demodulation reference signal allocating section. The receiving terminal includes a power detecting section that detects a first signal transmitted in a position where an additional demodulation reference signal in a resource block from the transmitting section is installed, and a second signal transmitted in a position of another channel state information reference signal installed in a resource block used by the other base station; and a received power acquiring section that removes the second signal from the first signal, and that acquires received power from the base station based on a signal obtained by the removal.

By the aforementioned method and system according to several aspect of the invention, a user terminal can detect a received power of a single base station which carries out downlink joint transmission. Furthermore, a serving base station is capable of carrying out optimal allocation of power to respective transmission base stations depending upon the received power from each of the base stations being fed back by the user terminals.

BRIEF DESCRIPTION OF DRAWINGS

Modes and/or other modes and superiority of the present invention will be clearer and easily comprehensible from the following detailed description in which drawings and Embodiments of the invention are combined, wherein.

DESCRIPTION OF EMBODIMENTS

Concrete Embodiments of the present invention will be described in detail in combination with the drawings. Concerning several related prior arts, if detailed description thereof is taken into consideration, there is fear that essential points of the present invention become blurry and therefore, details of the prior arts are not described here. In the Embodiments, elements or section that execute the same function are designated with the same symbols.

Embodiment 1

One of relatively easy realizing methods for making it possible for a receiving terminal to detect a received power of a single base station that participates in DL joint transmission is to install one resource element (RE) to a resource block used by a base station of a cell, to use the same to express a DM-RS representing received power, and carrying out puncturing in a corresponding position in a resource block of another cell of this added DM-RS. Since this added DM-RS keeps orthogonality between cells by carrying out the puncturing in the corresponding position, the terminal can detect a received power from a base station of the cell directly from the added DM-RS.

Figure 1:
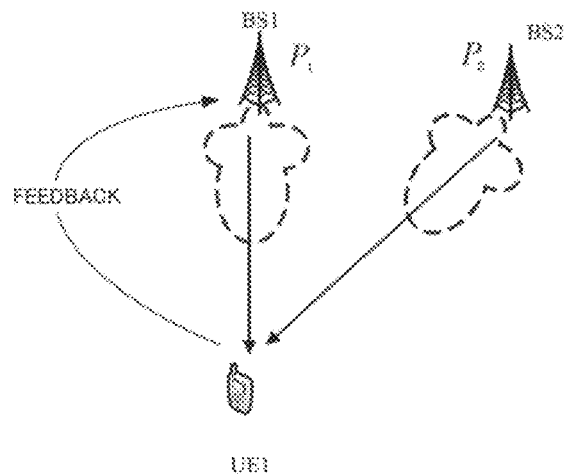
FIG. 1 shows a framework of an exemplified system of a DL joint transmission.
Figure 2:
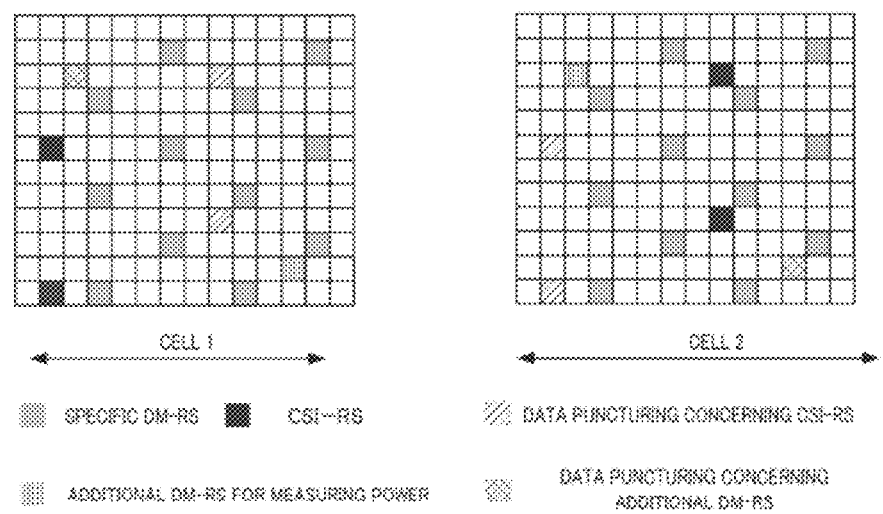
FIG. 2 shows an exemplified installation state of a reference signal in a resource block used by a cell in a received power detecting method according to Embodiment 1 of the present invention.

FIG. 2 shows an exemplified installation state of a reference signal in a resource block used by a cell in a received power detecting method to which the above-described method is applied. As shown in FIG. 2, BS 1 in cell 1 and BS 2 in cell 2 transmit data to a terminal using resource blocks (resource block 1 and resource block 2, hereinafter) having the same time frequency resources. The resource blocks having the same time frequency resources use modulation of an OFDM method. Two CSI-RSs of a corresponding cell are installed in resource blocks 1 and 2, orthogonality is kept between CSI-RSs of cell 1 and cell 2 by carrying out the puncturing in corresponding positions in the resource blocks of the adjacent cells. One additional DM-RS to represent received power are installed in resource block 1 and resource block 2, in addition to specific DM-RS that is originally provided. Since the additional DM-RS are orthogonal to each other between cells, received power from cell 1 and cell 2 can directly be detected by the terminal from the additional DM-RSs of cell 1 and cell 2.

Embodiment 2

The received power detecting method disclosed in Embodiment 1 has a drawback that overhead is increased. As shown in FIG. 2, overheads of two REs for the additional DM-RS are increased in resource blocks 1 and 2. Since the specific DM-RS that is originally provided occupies 12 REs in one resource block, the method for installing such an additional DM-RS increases the overhead of the DM-RS by 15%.

Figure 3:
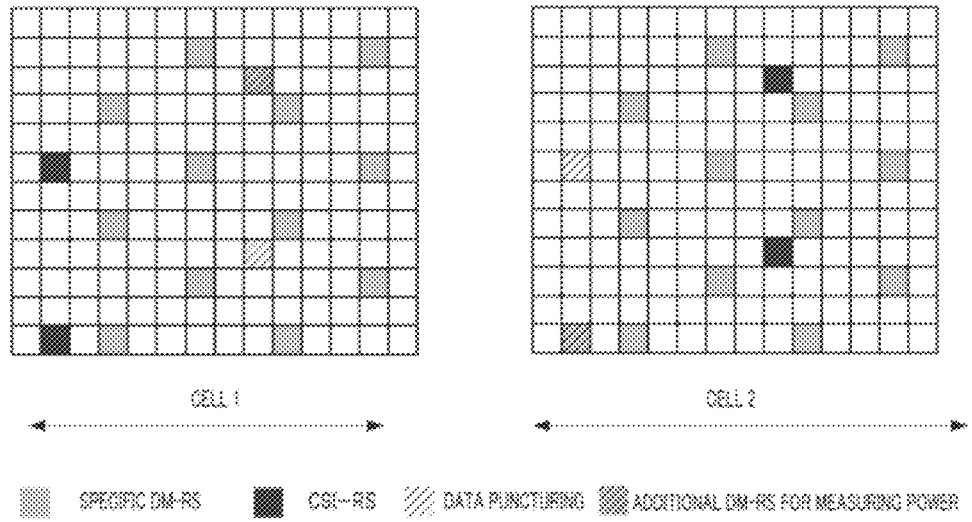
FIG. 3 shows an exemplified installation state of a reference signal in a resource block used by a cell in a received power detecting method according to Embodiment 2 of the invention.

Embodiment 2 improves the received power detecting method in terms of this problem. FIG. 3 shows an exemplified installation state of a reference signal in a resource block used by a cell in a received power detecting method according to Embodiment 2 of the invention. As shown in FIG. 3, in Embodiment 2, one additional DM-RS to represent received power is installed in resource blocks 1 and 2, and the additional DM-RS is located in a position where puncturing is carried out in correspondence with a CSI-RS in another cell in the resource block. More specifically, in resource block 1, the additional DM-RS is installed in one of two positions where puncturing is carried out in correspondence with a CSI-RS in resource block 2, and in resource block 2, the additional DM-RS is installed in one of two positions where puncturing is carried out in correspondence with the CSI-RS in resource block 1. As shown in the drawing, two CSI-RSs are installed in each cell (in reality, two or more CSI-RSs can be installed), and there are two puncturing positions in each resource block correspondingly. Since the additional DM-RS occupies only one puncturing position among them, another CSI-RS keeps orthogonality between cells and it can be used to specify the CSI-RS. Concerning cell 1, the additional DM-RS and one CSI-RS of cell 2 are mixed in a receiving terminal, but since another CSI-RS of cell 2 does not receive interference, the receiving terminal can remove the CSI-RS of cell 2 from the mixed signal, and a remaining signal is the additional DM-RS of cell 1. The terminal can acquire received power concerning cell 1 from the additional DM-RS of cell 1. Further, the terminal can similarly acquire received power of cell 2 by the same method.

Figure 4A:
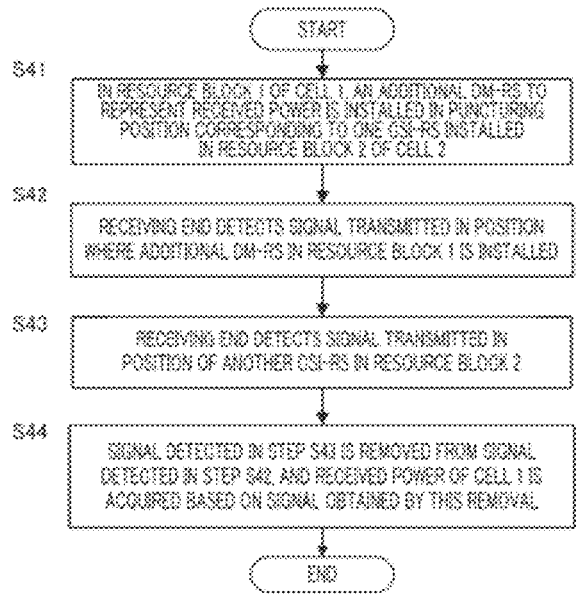
FIGS. 4(a) and 4(b) are flowcharts showing the received power detecting method according to Embodiment 2 of the invention.

FIG. 4(a) is a flowchart showing the received power detecting method according to Embodiment 2 of the invention. In step S41, in resource block 1 of cell 1, an additional DM-RS to represent received power is installed in a puncturing position corresponding to one CSI-RS installed in resource block 2 of cell 2; in step S42, the receiving terminal detects a signal transmitted in a position where the additional DM-RS in resource block 1 is installed; in step S43, the receiving terminal detects a signal transmitted in a position of another CSI-RS in resource block 2; and in step S44, the signal detected in step S43 is removed from the signal detected in step S42, and received power of cell 1 is acquired based on a signal obtained by this removal. As shown in FIG. 3, since two CSI-RSs are installed in resource block 2, in correspondence with this, there are two puncturing positions in resource block 1. In step S41, the additional DM-RS is installed in one of the two puncturing positions of resource block 1.

Similarly, by subjecting cell 2 to processes corresponding to steps S41 to S44, it is possible to acquire received power of cell 2, and this point is not described again.

Figure 4B:
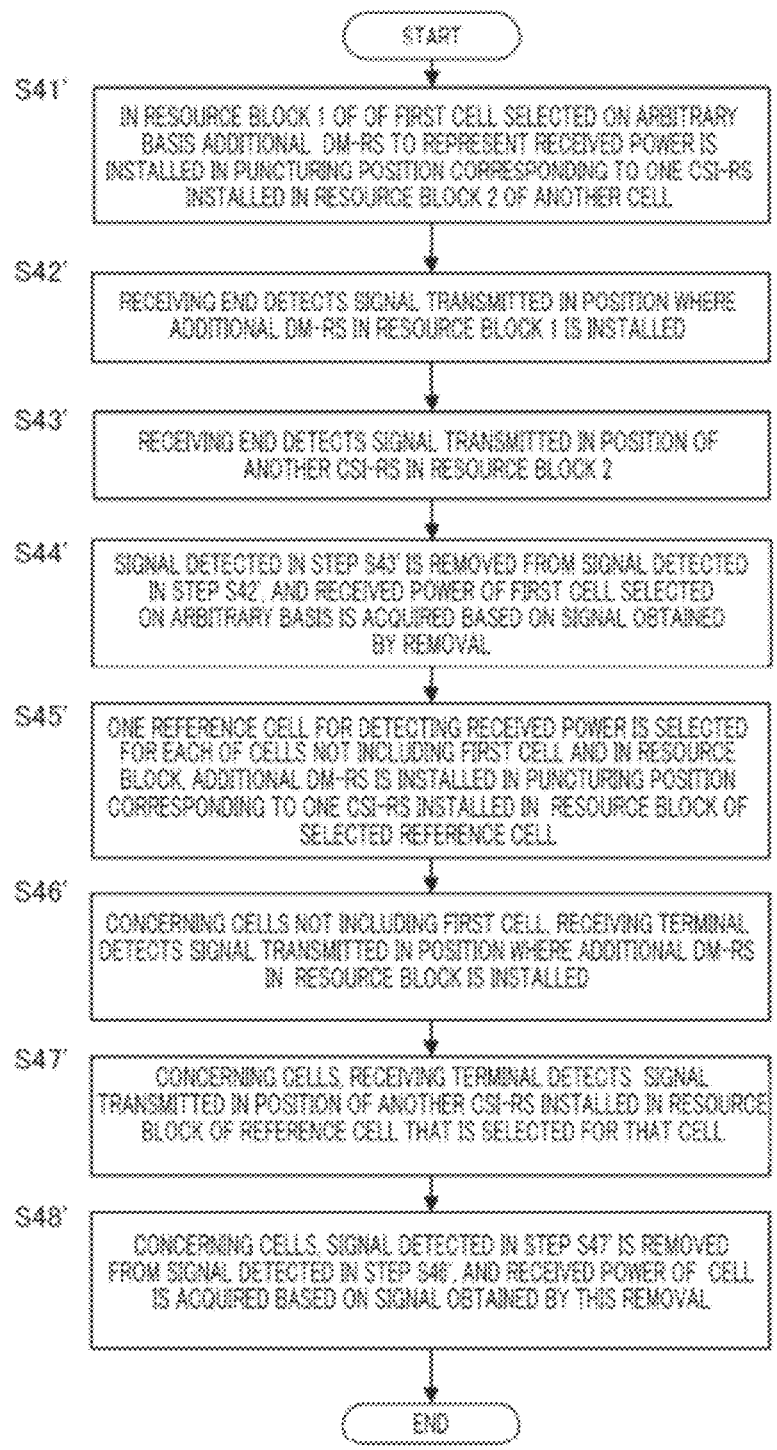

The received power detecting method of Embodiment 2 is described while taking the two cells as an example with reference to FIGS. 3 and 4(a). In reality, the method described in Embodiment 2 can be applied to a case of a plurality of cells. As shown in FIG. 4(b), in the case of a plurality of cells, in step S41', in resource block 1 of a first cell selected on an arbitrary basis, an additional DM-RS to represent received power is installed in a puncturing position corresponding to one CSI-RS installed in resource block 2 of another cell; in step S42', a receiving terminal detects a signal transmitted in a position where the additional DM-RS in resource block 1 is installed (i.e., a mixture signal of the additional DM-RS installed by the first cell and a CSI-RS of the other cell); in step S43', the receiving terminal detects a signal transmitted in a position of another CSI-RS in resource block 2 (i.e., a CSI-RS that does not receive interference in the other cell); and in step S44', the signal detected in step S43' is removed from the signal detected in step S42', and received power of the first cell selected on an arbitrary basis is acquired based on a signal obtained by the removal. It is possible to detect received power of any signal cell by the steps S41' to 44'. Thereafter, it is possible to detect received power of each of other cells by similar process. More specifically, in step S45', one reference cell for detecting received power is selected for each of the cells not including the first cell and in the resource block, the additional DM-RS is installed in the puncturing position corresponding to one CSI-RS installed in the resource block of the selected reference cell. In step S46', concerning the cells not including the first cell, the receiving terminal detects a signal transmitted in a position where the additional DM-RS in the resource block is installed. In step S47', concerning the cells, the receiving terminal detects a signal transmitted in the position of another CSI-RS installed in a resource block of a reference cell that is selected for that cell. In step S48', concerning the cells, a signal detected in step S47' is removed from the signal detected in step S46', and received power of the cell is acquired based on a signal obtained by this removal.

When the method described in Embodiment 2 is applied to a plurality of cells, for each of the cells, if one puncturing position corresponding to a CSI-RS in a resource block of another cell is selected on an arbitrary basis and the additional DM-RS is installed, there is a possibility that a problem that received power of each of the cells cannot be acquired is generated. For example, assume that three cells, i.e., cell 1, cell 2 and cell 3 exist and two CSI-RSs are installed in each of resource blocks, i.e., resource block 1, resource block 2 and resource block 3. Under such circumstances, concerning cell 1, if an additional DM-RS is installed in a puncturing position corresponding to one CSI-RS installed in resource block 2 in resource block 1, and concerning cell 2, if an additional DM-RS is installed in a puncturing position corresponding to one CSI-RS installed in resource block 1 in resource block 2, it is possible to acquire received power of cell 1 and cell 2 by steps S42' to S44' and S46' to S48'. However, in this case, concerning cell 3, even if an additional DM-RS is installed in any of puncturing positions in the resource block, received power of cell 3 cannot be acquired by applying the processes of steps S46' to S48'. If it is desired to acquire received power of each cell in the environment of a plurality of cells, it is necessary to select an appropriate puncturing position and install an additional DM-RS. As one possible solution, when one reference cell for detecting received power of respective cells not including the first cell is selected in step S45' and the additional DM-RS is added in a puncturing position corresponding to one CSI-RS in a resource block of the reference cell, it is necessary to observe a principle that concerning a plurality of CSI-RSs of the respective cells of the plurality of cells (including the first cell), the additional DM-RS is installed in one position of the plurality of puncturing positions corresponding to the plurality of CSI-RSs in the resource block only by one of the remaining cells. The principle is merely one example, and it can easily be understood that if a person skilled in the art observes other principles, it is possible to specify an appropriate puncturing position for installing the additional DM-RS. In reality, even if received power of cell 3 cannot be acquired by applying the processes of steps S46' to S48', it is possible to acquire received power of cell 3 by methods of later-described Embodiment 3 and Embodiment 5.

In Embodiment 2, since the additional DM-RS is located in its original puncturing position and does not occupy a new resource element, redundant overhead is not brought about.

Embodiment 3

From the description of Embodiment 1, the additional DM-RS installed by the present invention is removed, and it is not difficult to find a fact that the specific DM-RS in a resource block does not receive any influence. As described above, on the side of the terminal, since specific DM-RSs of resource blocks of different cells are superimposed on each other, the terminal can acquire total received power from the cells by detecting the superimposed specific DM-RSs. Embodiment 3 of the invention is proposed based on this fact.

Figure 5:
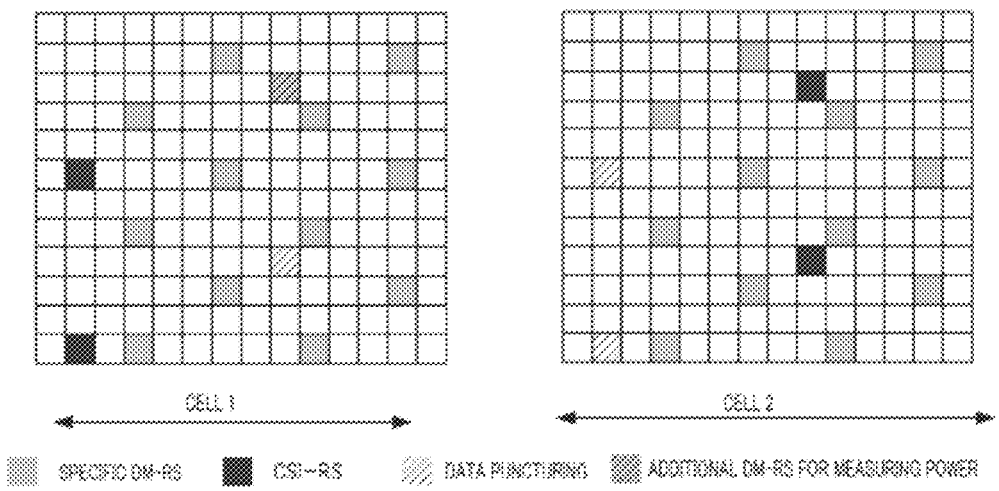
FIG. 5 shows an exemplified installation state of a reference signal in a resource block used by a cell in a received power detecting method according to Embodiment 3 of the invention.

FIG. 5 shows an exemplified installation state of a reference signal in a resource block used by a cell in a received power detecting method according to Embodiment 3 of the invention. If FIGS. 3 and 5 are compared with each other, it can be understood that installations of reference signals in resource blocks in Embodiment 3 and Embodiment 2 are different from each other in the following points. That is, in Embodiment 3, one additional DM-RS is installed only in resource block 1 and in resource block 1, the additional DM-RS is located in one of two positions where puncturing is carried out in correspondence with a CSI-RS in resource block 2. In resource block 2, the additional DM-RS is not installed. In such circumstances, concerning cell 1, it is possible to likewise detect received power of cell 1 based on the above-described steps S41 to S44 described in Embodiment 2. In contrast, concerning cell 2, it is possible to acquire received power from cell 2 by subtracting received power of cell 1 from total received power acquired by detecting the superimposed specific DM-RS.

Figure 6A:
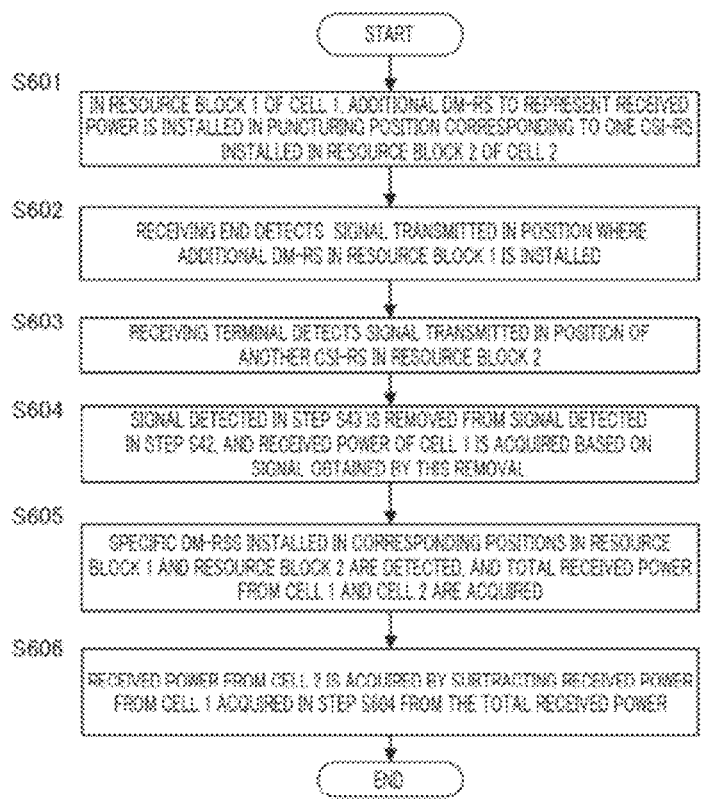
FIGS. 6(a) and 6(b) are flowcharts showing the received power detecting method according to Embodiment 3 of the invention.

FIG. 6(a) is a flowchart of the received power detecting method of Embodiment 3 of the invention. Steps S601 to S604 in FIG. 6(a) are completely the same as steps S41 to S44 in FIG. 4(a), and these steps are not described again. After received power from cell 1 is acquired by steps S601 to S604, it is possible to acquire received power of cell 2 by the following steps if necessary. In step S605, specific DM-RSs installed on corresponding positions in resource block 1 and resource block 2 are detected, and total received power from cell 1 and cell 2 are acquired. In step S606, received power from cell 2 is acquired by subtracting received power from cell 1 acquired in step S604 from the total received power.

Figure 6B:
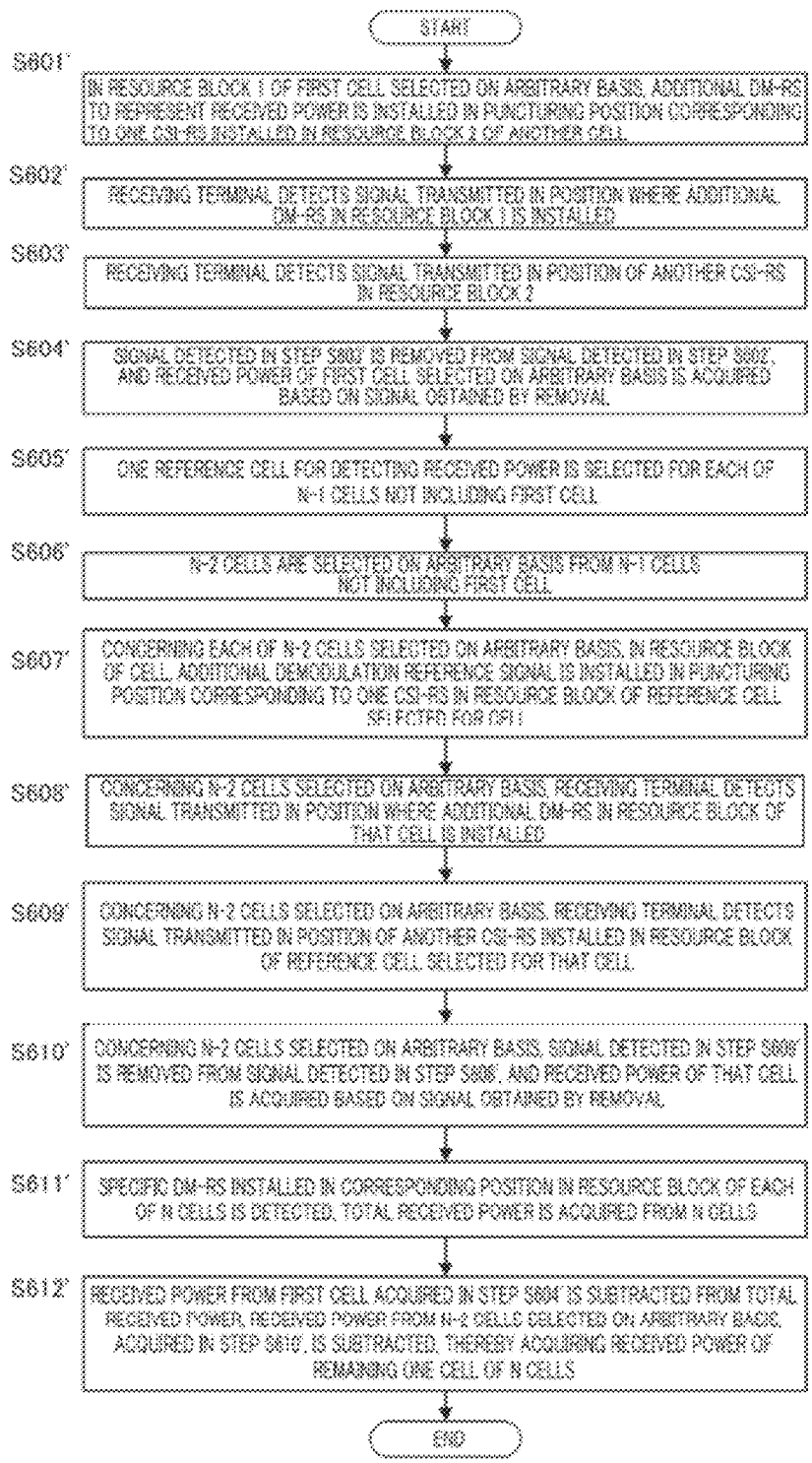

It is easily understood that the received power detecting method described in Embodiment 3 can be applied to a case where there are a plurality of cells. When there are a plurality of cells (e.g., N cells), that is, similar to a case where there are two cells, it is possible to acquire received power from N cells by installing additional DM-RSs only in resource blocks of N−1 cells. As shown in FIG. 6(b), when there are N cells, after received power of any single cell (e.g., first cell) is detected by steps S601' to S604' that are completely the same as steps S41' to S44' in FIG. 4(b), it is possible to detect received power of other N−1 cells by the following steps. Specifically, in step S605', one reference cell for detecting received power is selected for each of N−1 cells not including the first cell. In step S606', N−2 cells are selected on an arbitrary basis from N−1 cells not including the first cell. In step S607', concerning each of N−2 cells selected on an arbitrary basis, in a resource block of the cell, an additional demodulation reference signal is installed in a puncturing position corresponding to one CSI-RS in a resource block of a reference cell selected for the cell (since the additional DM-RS is installed in the first cell in step S601' and additional DM-RSs are installed only in other N−2 cells in step S607', in the total N cells, additional DM-RSs are installed only in N−1 cells). In step S608', concerning the N−2 cells selected on an arbitrary basis, the receiving terminal detects a signal transmitted in a position where an additional DM-RS in a resource block of that cell is installed. In step S609', concerning N−2 cells selected on an arbitrary basis, the receiving terminal detects a signal transmitted in a position of another CSI-RS installed in a resource block of a reference cell selected for that cell. In step S610', concerning N−2 cells selected on an arbitrary basis, the signal detected in step S609' is removed from the signal detected in step S608', and received power of that cell is acquired based on a signal obtained by the removal. In step S611', specific DM-RS installed in a corresponding position in a resource block of each of N cells is detected, total received power is acquired from the N cells. In step S612', received power from the first cell acquired in step S604' is subtracted from the total received power, received power from N−2 cells selected on an arbitrary basis acquired in step S610' is subtracted, thereby acquiring received power of remaining one cell of the N cells (i.e., cell in which an additional DM-RS is not installed in its resource block). In step S605', when one reference cell for detecting received power is selected for each of the N−1 cells from which the first cell is removed, it is easily understood that it is likewise possible to observe the principle disclosed in Embodiment 2.

In Embodiment 3, since the additional DM-RS is installed in a puncturing position in a resource block of only the N−1 cells of total N cells, the system overhead in Embodiment 3 is further reduced as compared with Embodiment 2.

Embodiment 4

The system overhead is further reduced in Embodiment 3 but the reduction degree is still insufficient. As shown in FIG. 5 for example, the additional DM-RS is located in a position where puncturing is carried out in correspondence with a CSI-RS in resource block 2 in resource block 1 of cell 1. To detect this additional DM-RS, the terminal first has to detect a CSI-RS of cell 2. In Embodiment 3, measurement of received power of cell 1 depends on measurement of CSI-RS of cell 2. Under actual radio environment, if a channel state of cell 2 is poor, the accuracy for received power detection in cell 1 based on CSI-RS of cell 2 is influenced. To solve this problem, Embodiment 4 of the invention is proposed.

Figure 7:
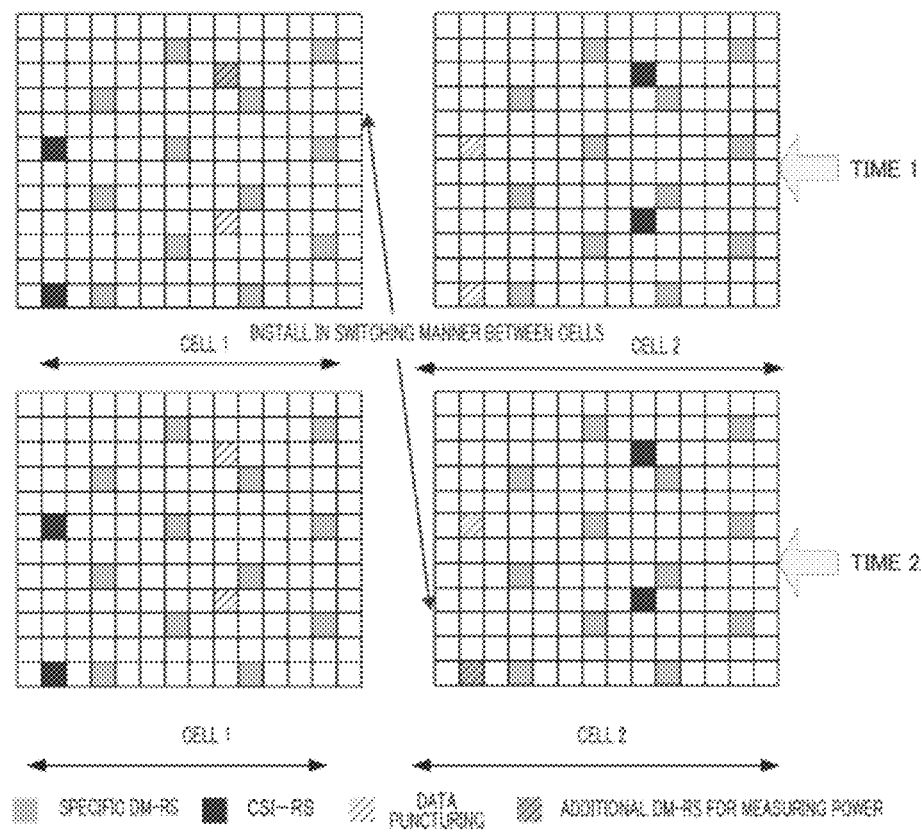
FIG. 7 shows an exemplified installation state of a reference signal in a resource block used by a cell in a received power detecting method according to Embodiment 4 of the invention.

FIG. 7 shows an exemplified installation state of a reference signal in a resource block used by a cell in a received power detecting method according to Embodiment 4 of the invention. If FIGS. 5 and 7 are compared with each other, the following fact can be understood: in FIG. 5, an additional DM-RS is installed stationary in a resource block of cell 1; in FIG. 7 on the other hand, an additional DM-RS is installed in a resource block of cell 1 at time 1, and an additional DM-RS is installed in a resource block of cell 2 at time 2. In Embodiment 4, the additional DM-RS can be installed in a switching manner in time domain between cells based on the channel state of the cell. According to this, it is possible to reduce the influence generated upon measurement of entire power that is caused when a channel of a certain cell is poor.

The received power detecting method of Embodiment 4 of the invention is the same as the received power detecting method of Embodiment 3 of the invention described with reference to FIG. 6(a). Concerning the state shown in FIG. 7 for example, it is possible to detect received power of cells 1 and 2 using the received power detecting method shown in FIG. 6(a) at time 1 and time 2. To install an additional DM-RS in a switching manner in time domain between cells, in step S601 in FIG. 6(a), it is possible to select installation of the additional DM-RS in a puncturing position in resource block while using time resource included in at least one resource block as a unit, or installation of the additional DM-RS in a puncturing position in resource block 2.

Embodiment 5

The received power detecting method described in Embodiment 4 can be applied to a state where there are a plurality of cells and therefore, Embodiment 5 of the invention is proposed.

Figure 8:
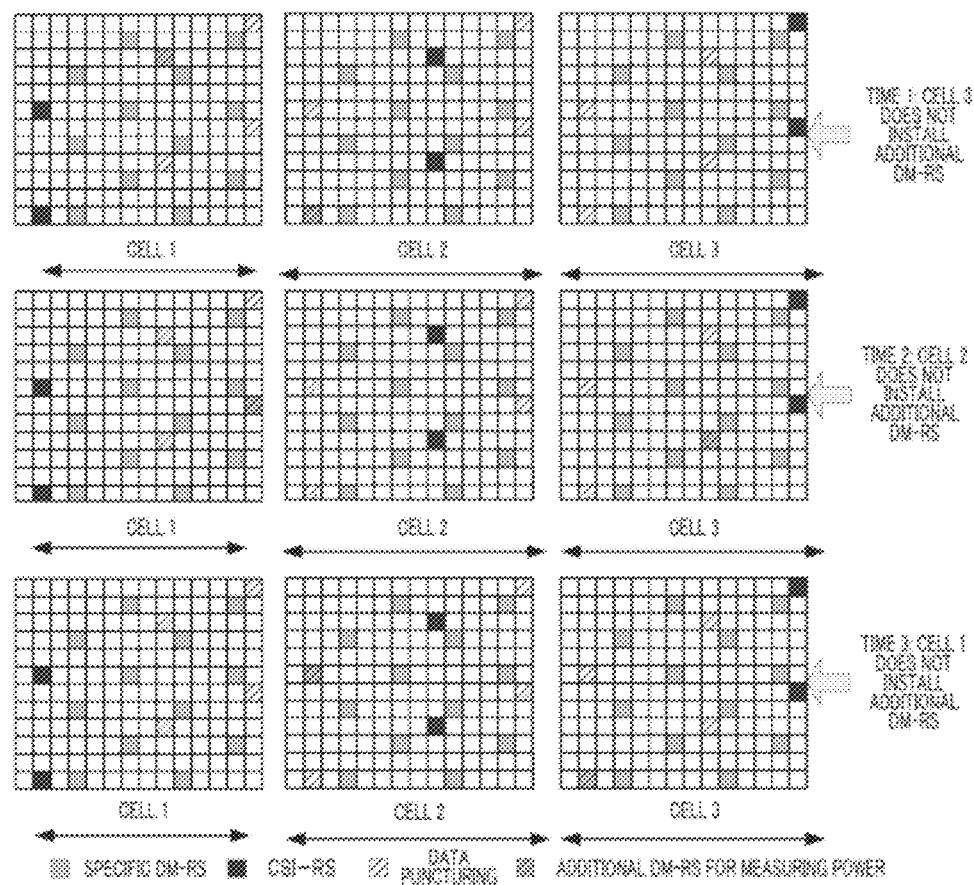
FIG. 8 shows an exemplified installation state of a reference signal in a resource block used by a cell in a received power detecting method according to Embodiment 5 of the invention.

FIG. 8 shows an exemplified installation state of a reference signal in a resource block used by a cell in a received power detecting method according to Embodiment 5 of the invention. As shown in FIG. 8, the additional DM-RS is installed only for two cells of three cells at any of times. More specifically, installation of additional DM-RSs for cell 1 and cell 2 is selected at time 1; additional DM-RSs are installed only for cell 1 and cell 3 at time 2; and additional DM-RSs are installed only for cell 2 and cell 3 at time 3. In Embodiment 5, it is possible to install the additional DM-RS in a switching manner in time domain between cells. According to this, it is possible to reduce the influence generated upon measurement of entire power that is caused when a channel of a certain cell is poor.

The received power detecting method of Embodiment 5 of the invention is the same as the received power detecting method of Embodiment 3 of the invention described with reference to FIG. 6(b). Concerning the state shown in FIG. 8 for example, it is possible to detect received power of cells 1 to 3 using the received power detecting method shown in FIG. 6(b) at time 1 to time 3. To install an additional DM-RS in a switching manner in time domain between cells, in step S606' in FIG. 6(b), it is possible to change N−2 cells that are selected on an arbitrary basis from N−1 cells from which the first cell is removed while using time resource included in at least one resource block as a unit.

Embodiment 6

In a multi-antenna radio communication system based on OFDM of LTE-A, for example, eight antenna ports exist in each of the cells, and all of the eight antenna ports transmit data to the terminal using a resource block having the same time frequency resource. At least two CSI-RSs of corresponding cell are installed in the resource block used by the antenna ports, and CSI-RSs of the antenna ports of cells are orthogonal to each other.

The above-described Embodiments of the invention can be all applied to the state of the plurality of antenna ports described above. For example, concerning one antenna port of any one of cells, an additional DM-RS to represent received power can be installed in a puncturing position that corresponds to one CSI-RS in a resource block of an antenna port located in another cell in the resource block. Thereafter, it is possible to acquire received power from any one of cells by removing a CSI-RS that does not receive interference from a mixture signal of detected CSI-RS and DM-RS. If an additional DM-RS is installed in one puncturing position in one antenna port, additional DM-RSs are installed, at the same time, in the same puncturing positions in resource blocks of other antenna ports in cells to which the former antenna port belongs.

When additional DM-RSs are installed in a plurality of antenna ports in one cell while applying the methods described in the Embodiments, it is only necessary to install an additional DM-RS in a puncturing position corresponding to a CSI-RS of one antenna port of other cell, and it is unnecessary to install additional DM-RSs in puncturing positions corresponding to CSI-RSs of all of antenna ports of the other cell. Therefore, concerning a plurality of antenna ports in one cell, when additional DM-RSs are installed in puncturing positions corresponding to a CSI-RS of an antenna port i of another cell, the accuracy of estimation for a receiving terminal with respect to the DM-RS depends on the accuracy of estimation for a CSI-RS with respect to the antenna port i in reality. When a CSI-RS of the antenna port i is transmitted through a poor channel transmission condition that is similar to the problem described in Embodiment 3, there is a possibility that detection of received power is influenced. To reduce the influence of this kind, Embodiment 6 of the invention is proposed.

Figure 9:
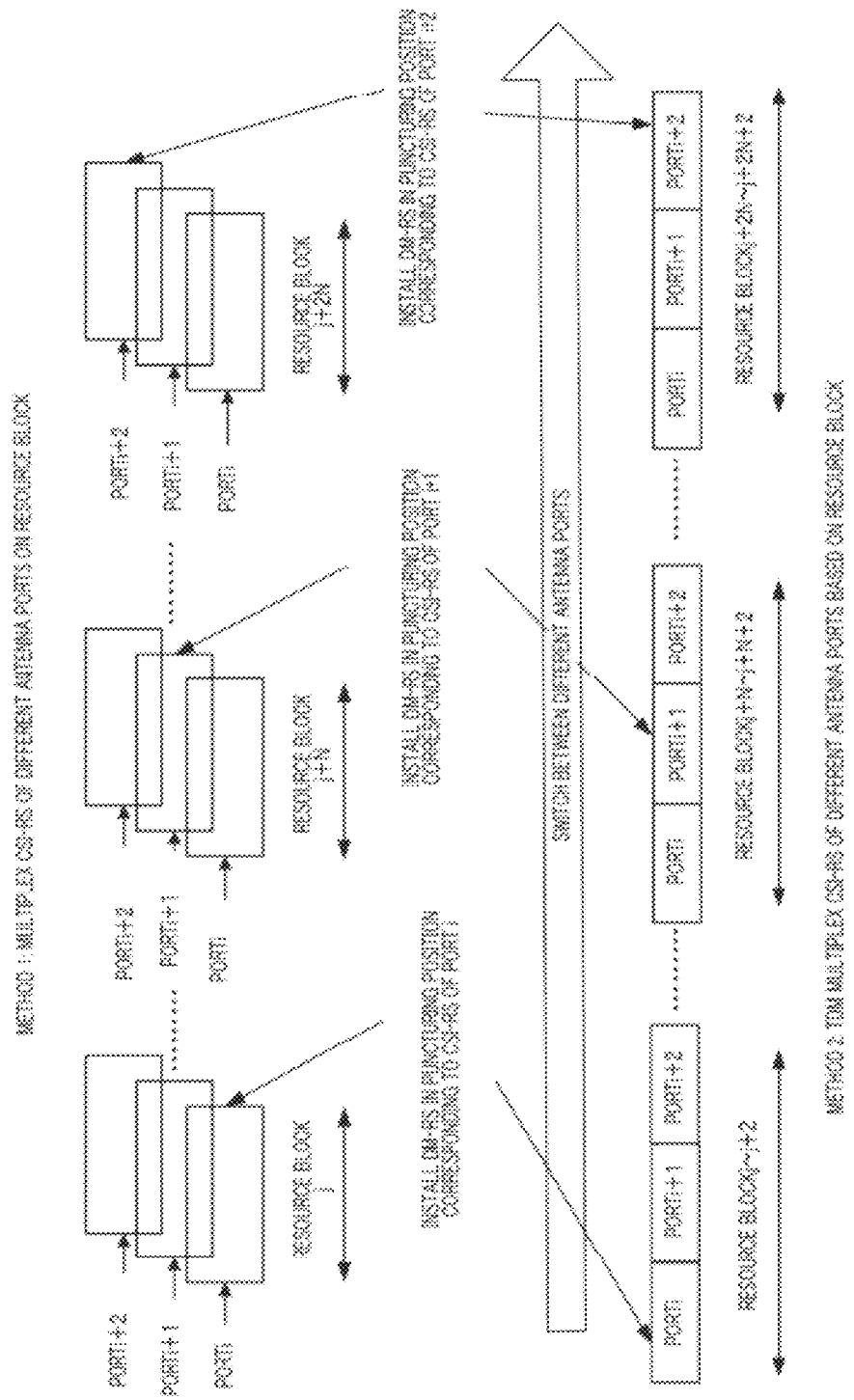
FIG. 9 is a schematic diagram showing a switching installation of additional DM-RSs on a plurality of puncturing positions corresponding to CSI-RSs of different antenna ports of the same cell according to Embodiment 6 of the invention.

According to Embodiment 6 of the invention, when additional DM-RSs are installed in a plurality of antenna ports in one cell, the additional DM-RSs are installed in a switching manner in time domain on a plurality of puncturing positions corresponding to a CSI-RS of a different antenna port of another cell. FIG. 9 is a schematic diagram showing a switching installation of additional DM-RSs on a plurality of puncturing positions corresponding to CSI-RSs of different antenna ports of the same cell according to Embodiment 6 of the invention. FIG. 9 shows two kinds of possible switching installation methods that respectively correspond to multiplex methods of possible two kinds of CSI-RSs. According to one of the multiplex methods, all of CSI-RSs from different antenna ports of the same cell are multiplexed on the same resource block. According to the other multiplex method, CSI-RSs from different antenna ports of the same cells are multiplexed on different resource blocks like TDM multiplex based on a resource block for example. It is possible to carry out Embodiment 6 no matter which multiplex method of a CSI-RS is used. In other word, an additional DM-RS is installed in a switching manner in time domain on a plurality of puncturing positions corresponding to CSI-RSs of different ports of the same cell.

Embodiment 7

As described above, it is explained in Embodiments 4 and 5 of the invention that the additional DM-RS is installed in a switching manner between different cells, and it is explained in Embodiment 6 that the additional DM-RS is installed in a switching manner on puncturing positions corresponding to CSI-RSs of different antenna ports of the same cell. In the actual state, it is possible to obtain Embodiment 7 of the invention by combining Embodiments 4 or 5 with 6.

Figure 10:
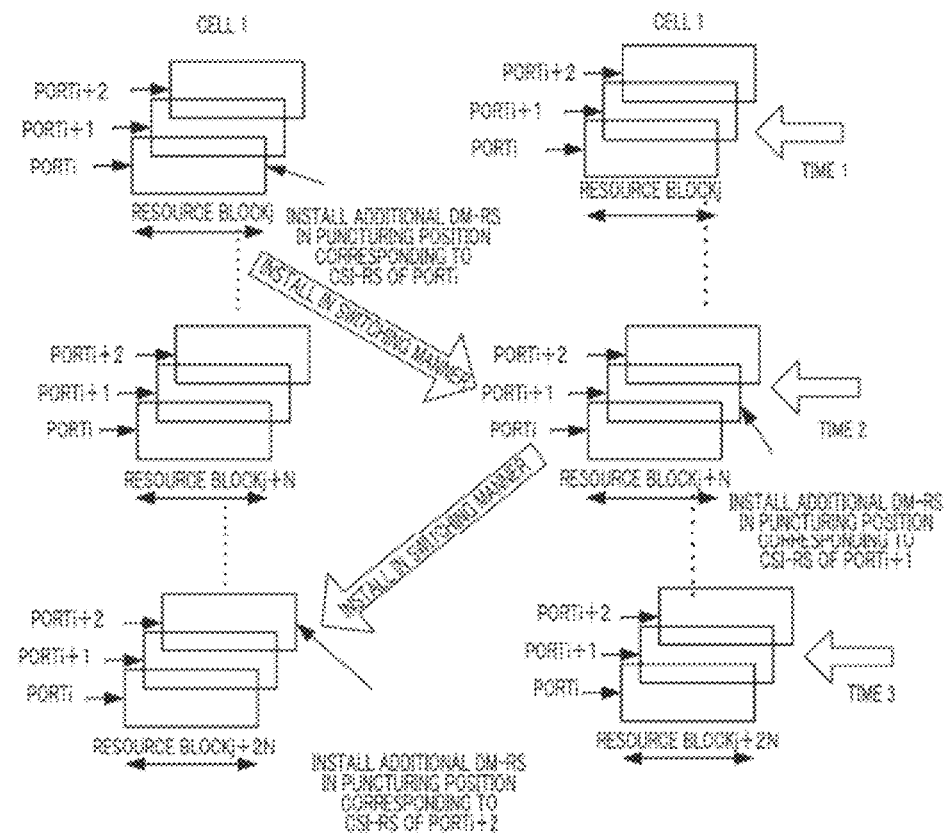
FIG. 10 is a schematic diagram showing a switching installation of additional DM-RSs in puncturing positions corresponding to different antenna ports of different cells and the same cell according to Embodiment 7 of the invention.

FIG. 10 is a schematic diagram showing a switching installation of additional DM-RSs in puncturing positions corresponding to different antenna ports of different cells and the same cell according to Embodiment 7 of the invention. As shown in FIG. 10, an additional DM-RS is installed in a puncturing position corresponding to a CSI-RS of a port i of cell 2 in a resource block of cell 1 at time 1, an additional DM-RS is installed in a puncturing position corresponding to a CSI-RS of a port i+1 of cell 1 in a resource block of cell 2 at time 2, and an additional DM-RS is installed in a puncturing position corresponding to a CSI-RS of a port i+2 of cell 2 in a resource block of cell 1 at time 3. From this, it can be understood that the additional DM-RS is installed in a switching manner in puncturing positions corresponding to CSI-RSs of different antenna ports of different cells and other cells in resource blocks of the different cells at different time, and a gain of the maximum selection diversity is acquired.

Embodiment 7 of the invention can be applied to a state of a plurality of cells (e.g., N cells). Similarly, in the state of the plurality of cells, additional DM-RSs are installed in puncturing positions corresponding to CSI-RSs of antenna ports where other cells exist in resource blocks of N−1 cells at any of times. According to this, additional DM-RSs are installed in different N−1 cells at different times, and concerning respective cells of the N−1 cells, the additional demodulation reference signals are installed in a switching manner on a plurality of puncturing positions corresponding to CSI-RSs of different ports of another cell. It can easily be understood that received power of respective cells of N cells can be detected by applying the received power detecting method of Embodiment 3 of the invention at any of time.

Embodiment 8

According to Embodiment 7 of the invention, additional DM-RSs are installed in N−1 cells of N cells at any of times. However, there is a possibility that the channel state does not vary significantly at some of times. Therefore, in reality, it is possible to install additional DM-RSs in some of cells fewer than N−1 number at some of times. Hence, Embodiment 8 of the invention is proposed.

Figure 11:
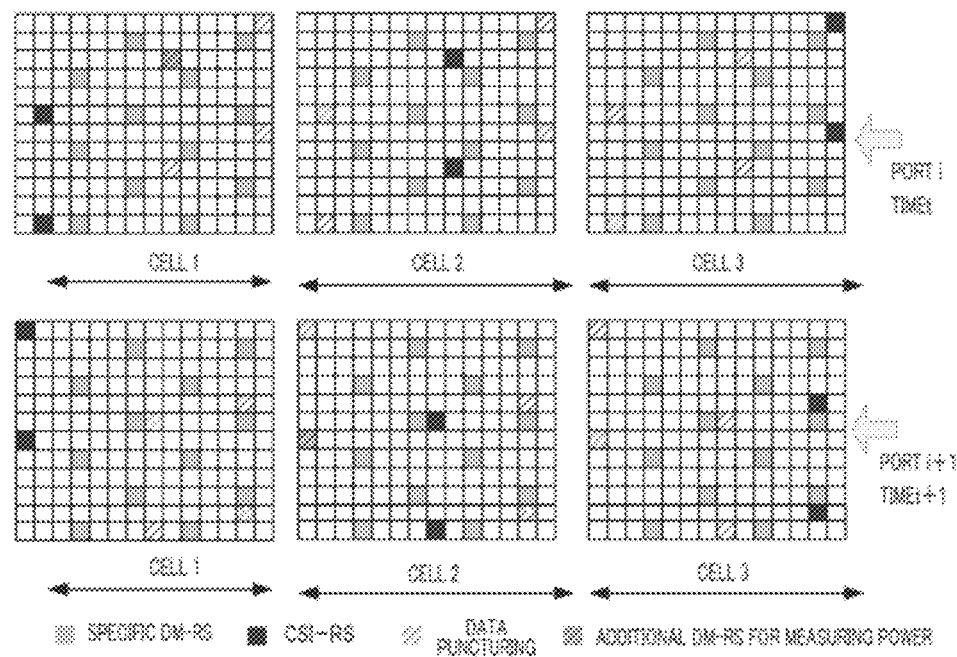
FIG. 11 is a schematic diagram showing a switching installation of additional DM-RSs in puncturing positions corresponding to different antenna ports of different cells and the same cell according to Embodiment 8 of the invention.

FIG. 11 is a schematic diagram showing a switching installation of additional DM-RSs in puncturing positions corresponding to different antenna ports of different cells and the same cell according to Embodiment 8 of the invention. Assume that the channel state does not vary significantly at time t and time t+1. As shown in FIG. 11, at time t, an additional DM-RS is installed only in a puncturing position corresponding to the port i of cell 2 in a resource block of cell 1, and at time t+1, an additional DM-RS is installed only in a puncturing position corresponding to a port i+1 of cell 1 in a resource block of cell 2. That is, at times when the channel state does not vary significantly, additional DM-RSs are installed in at most N−2 different cells, and additional DM-RSs are installed in a switching manner at a plurality of puncturing positions corresponding to CSI-RSs of different antenna ports of another cell in the resource block for each of the N−2 cells at most.

Since the channel state does not vary significantly at some of times, received power from a cell at previous time can be received power from the cell after that time. According to this, it is easily understood that it is possible to detect received power of each of N cells by applying the received power detecting method of Embodiment 3 of the invention at any of times. For example, in the state shown in FIG. 11, it is possible to detect received power from cell 1 at time t and received power from cell 2 at time t+1 by applying Embodiment 3 of the invention. Since the channel state does not vary significantly at time t and time t+1, received power from cell 2 at time t+1 can be received power from cell 2 at time t, and it is possible to acquire received power from cell 3 at time t by applying Embodiment 3 of the invention. Similarly, it is possible to acquire received power from each cell at time t+1 also.

According to Embodiment 8, the system overhead is further reduced as compared with Embodiment 7.

Embodiment 9

Although it is explained that a plurality of base stations transmit data to one user's terminal in any of the above Embodiments, in reality, any of a plurality of terminals can be under a joint transmission scheme, and the same radio resources, time frequencies and base stations can be used. In this case, to make it possible for base stations to use resources in common, it is necessary to carry out scheduling for these terminals.

Figure 12:
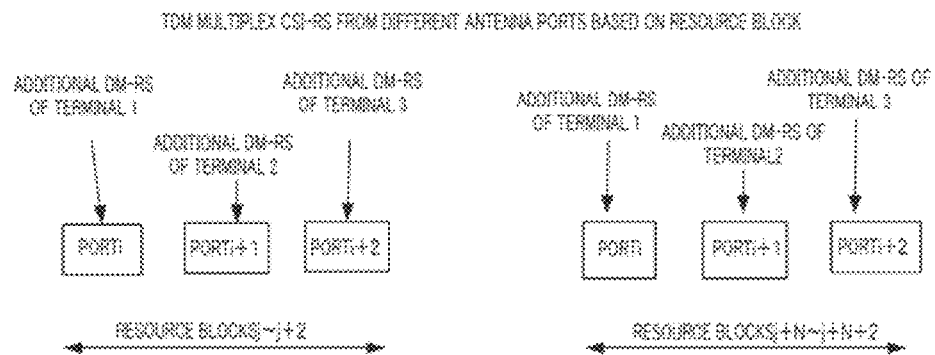
FIG. 12 is a schematic diagram showing that different terminals are scheduled to a resource block including a CSI-RS according to Embodiment 9 of the invention.

For example, in a multi-antenna system based on OFDM of LTE-A, a CSI-RS does not appear on respective resource blocks. For example, CSI-RSs appear on one of several resource blocks at time and frequency. Therefore, when a plurality of terminals detect received power using the additional DM-RS, there is a possibility that a problem is generated. Embodiment 9 shows one solution for the problem. As shown in FIG. 12, in Embodiment 9, CSI-RSs from different ports in the same cell are time division (frequency division) multiplexed on different resource blocks, and different terminals are scheduled on a CSI-RS resource block including a certain port. Thereafter, each terminal can measure power by the received power detecting method described in the Embodiment 9.

Figure 13:
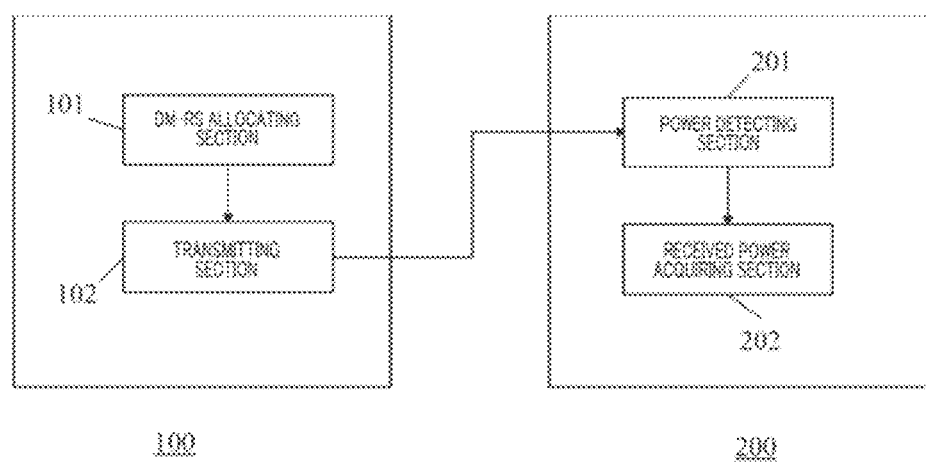
FIG. 13 shows a related apparatus in a radio communication system to which the received power detecting method of the Embodiments of the invention is applied.

The received power detecting methods of the invention were explained based on the plurality of Embodiments. A radio communication system in which the received power detecting method is applied will be described below. FIG. 13 shows a related apparatus in the radio communication system to which the received power detecting method of the Embodiments of the invention is applied. A plurality of adjacent cells are included in the radio communication system as described above, base stations of the adjacent cells transmit data to the receiving terminal in the radio communication system using resource blocks having the same time frequency resource, a plurality of CSI-RSs of corresponding cells are installed in respective resource blocks, and orthogonality is kept between CSI-RSs of the cells.

As shown in FIG. 13, base station 100 in a radio communication system includes DM-RS allocating section 101 that installs an additional DM-RS in a puncturing position corresponding to one CSI-RS in a resource block used by another base station (e.g., base station 110) in the radio communication system; and transmitting section 102 that transmits data to receiving terminal 200 using the resource block from DM-RS allocating section 101. Since a plurality of CSI-RSs are installed in resource blocks used by base station 110, there are a plurality of puncturing positions in the resource blocks used by the base station 100 in correspondence with the CSI-RSs. When the additional DM-RS is installed, DM-RS allocating section 101 selects one arbitrary puncturing position from a plurality of puncturing positions and installs the additional DM-RS.

Receiving terminal 200 includes power detecting section 201 that detects a signal (i.e., a mixture signal of the additional DM-RS and a CSI-RS of base station 110) transmitted in a position where an additional DM-RS in the resource block from the base station 100 is installed, and that detects a signal (i.e., CSI-RS that does not receive interference) transmitted in a position of another CSI-RS installed in a resource block used by base station 110; and received power acquiring section 202 that removes a CSI-RS that does not receive interference from the mixture signal and that acquires received power from base station 110 based on a signal obtained by the removal.

The radio communication system includes a plurality of base stations and a plurality of receiving terminals. The base stations and the receiving terminal can have the same configurations as those described above. Therefore, the receiving terminal can acquire received power of each of the plurality of base stations.

Concrete configurations of the base station and the receiving terminal in the radio communication system of one Embodiment of the invention do not limit the scope of the invention, they are merely exemplified explanations, several means can be omitted, functions of several means can be combined in one means and executed, functions of several means can be divided into a plurality of small means and executed.

The Embodiments in the present application are merely descriptions by way of illustration, concrete configuration and action of Embodiments do not limit the scope of the invention, a person skilled in the art can re-combine different portions and action in Embodiments and can create new methods to be executed, and they are applicable to ideas of the present invention.

The Embodiments of the invention can be realized by hardware, software, firmware and a combination thereof, and the realizing method does not limit the scope of the invention.

Connection relations between function elements (section) in the Embodiments of the invention do not limit the scope of the invention, and one of or a plurality of elements thereof may include other arbitrary function elements or may be connected to other arbitrary function elements.

Several Embodiments of the invention were described with reference to the drawings, but it is possible to change and modify the Embodiments without departing from principles and spirit of the invention, and it is apparent for a person skilled in the art that even if the Embodiments are changed or modified, such changed or modified Embodiment fall within the scope of patent claims of the invention and within the equivalent scope.

The invention claimed is:

1. A method for mapping a reference signal, the method comprising:
   mapping a demodulation reference signal (DM-RS) specific to a terminal to at least one resource element among plural first resource elements in a resource block of a first cell; and
   transmitting the mapped DM-RS to the terminal, wherein the resource element, to which the DM-RS is mapped, has a time and frequency that are same as that of one of at least two resource elements, to which a channel state information reference signal (CSI-RS) is mapped among plural second resource elements in a resource block of a second cell different from the first cell, and data is punctured or no data is transmitted in a resource element among the plural first resource elements, which has a time and frequency that are same as that of the other of said at least two resource elements, to which the CSI-RS is mapped among the plural second resource elements.

2. The method according to claim 1, wherein the CSI-RS is mapped to a resource block for each of a plurality of antenna ports in the second cell, and the resource element, to which the DM-RS is mapped, has a time and frequency that are same as that of a resource element, to which the CSI-RS is mapped in a resource block for one antenna port among the plurality of antenna ports.

3. The method according to claim 1, wherein the resource element, to which the DM-RS is mapped, varies over time.

4. The method according to claim 1, wherein the first cell performs a coordinated transmission with the second cell.

5. A base station apparatus comprising:

a mapping section configured to map a demodulation reference signal (DM-RS) specific to a terminal to at least one resource element among plural first resource elements in a resource block of a first cell; and a transmitting section configured to transmit the mapped DM-RS to the terminal, wherein the resource element, to which the DM-RS is mapped, has a time and frequency that are same as that of one of at least two resource elements, to which a channel state information reference signal (CSI-RS) is mapped among plural second resource elements in a resource block of a second cell different from the first cell, and data is punctured or no data is transmitted in a resource element among the plural first resource elements, which has a time and frequency that are same as that of the other of said at least two resource elements, to which the CSI-RS is mapped among the plural second resource elements.

6. The base station apparatus according to claim 5, wherein the CSI-RS is mapped to a resource block for each of a plurality of antenna ports in the second cell, and the resource element, to which the DM-RS is mapped, has a time and frequency that are same as that of a resource element, to which the CSI-RS is mapped in a resource block for one antenna port among the plurality of antenna ports.

7. The base station apparatus according to claim 5, wherein the resource element, to which the DM-RS is mapped, varies over time.

8. The base station apparatus according to claim 5, wherein the first cell performs a coordinated transmission with the second cell.

* * * * *